United States Patent [19]
Bremstahler

[11] 3,898,540
[45] Aug. 5, 1975

[54] CERAMIC DISK TRIMMER CAPACITOR

[75] Inventor: Manfred Bremstahler, Ruckersdorf, Germany

[73] Assignee: Firma Stettner & Co., Lauf, Pegnitz, Germany

[22] Filed: Oct. 24, 1974

[21] Appl. No.: 517,410

[30] Foreign Application Priority Data
Nov. 9, 1973 Germany............................ 2355977

[52] U.S. Cl.......................... 317/249 D; 317/249 R
[51] Int. Cl.² .......................................... H01G 5/06
[58] Field of Search...................... 317/249 R, 249 D

[56] References Cited
UNITED STATES PATENTS
2,499,634   3/1950   Ehlers et al...................... 317/249 D
FOREIGN PATENTS OR APPLICATIONS
566,986   1/1945   United Kingdom............. 317/249 D Primary Examiner—E. A. Goldberg
Attorney, Agent, or Firm—Flynn & Frishauf

[57] ABSTRACT

A ceramic stator disk is partly metallized to form a stator electrode, the disk being formed with a central aperture. A ceramic rotor disk, also partly metallized, fits against the stator disk, the rotor having a metallic shaft connected to the rotor metallization and passing, in insulated relation, through the aperture of the stator. To decrease the initial capacitance, to improve tracking and accuracy of positioning, the aperture of the stator has a bushing of low dielectric material fitted therein, for example of Teflon, the rotor disk likewise having a similar bushing fitted in the central opening, and the metallic shaft being retained in the rotor bushing and passing through the stator bushing, so that the metallized portions of the stator are additionally spaced by the width of the bushing from the metal shaft of the rotor and, due to the better bearing characteristics of the bushing, tracking is improved.

12 Claims, 22 Drawing Figures

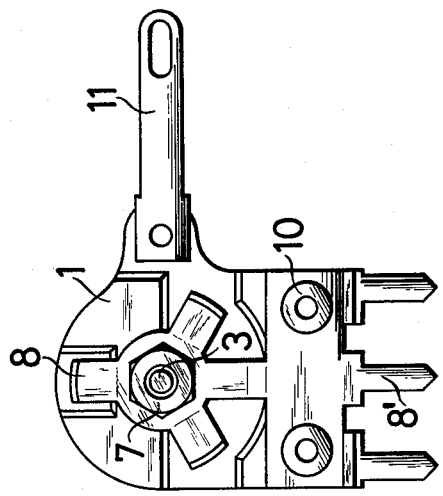
FIG. 3
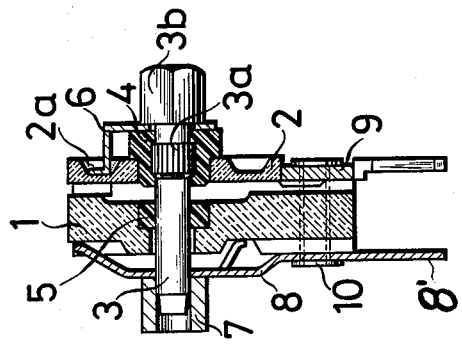
FIG. 2
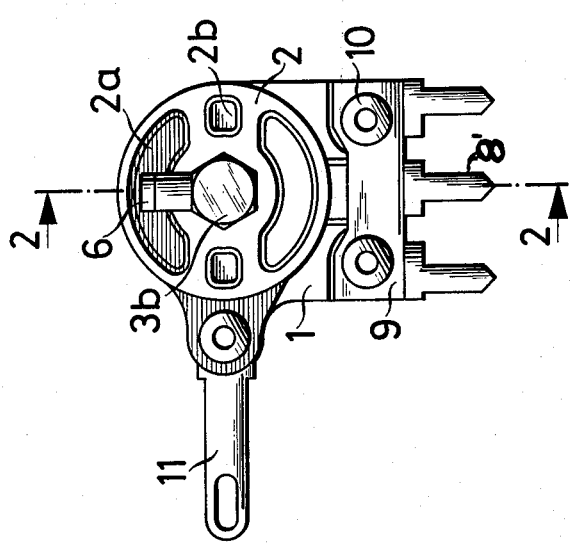
FIG. 1
FIG. 14
FIG. 13
FIG. 12
FIG. 11
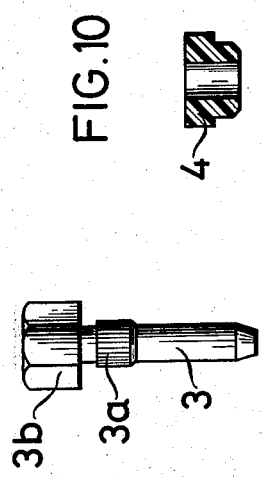
FIG. 10
FIG. 9

CERAMIC DISK TRIMMER CAPACITOR

CROSS REFERENCE TO RELATED PATENT

U.S. Pat. No. 3,486,089, assigned to the assignee of the present invention.

The present invention relates to a ceramic disk trimmer capacitor and more particularly to such a capacitor which is of the miniature, or sub-miniature type.

Ceramic disk trimmer capacitors usually have a stator to which also solder lugs and other attachment means may be secured, and a rotor which has a shaft guided in an aperture in the stator. Both stator and rotor have electrodes thereon which are approximately semi-circular, ring-shaped. The engagement surfaces of the rotor and stator are held together by means of a spring, or the like. The rotor is formed, at its upper surface, with a depression in order to receive the rotor electrode, the thickness of the rotor disk forming the dielectric between the rotor electrode and the stator electrode. The rotor electrode is accurately determined in size, shape and position by the depression formed in the rotor electrode (see, for example, German Pat. No. 1,151,071 corresponding to U.S. Pat. No. 3,185,904).

Capacitors of this type have a range of variation between a smallest, initial capacity (Cmin) and a maximum capacity (Cmax). The nominal minimum capacity of such trimmers is in the order of from 2 to 12 pF, depending on the dielectric constant of the material used, and the diameter of the rotor disk, particularly if dielectric in accordance with the standards P 100 to N 1500 (DIN) are used for the rotor disk. The control range of the trimmer capacitors is not great and at times does not meet design requirements. The accuracy of adjustment, particularly, is not good since some play will arise due to tolerances in the ceramic and the fit between the rotor shaft and the stator bore is difficult to maintain with accuracy.

It is an object of the present invention to improve disk trimmer capacitors by increasing the range of capacity between minimum and maximum capacity so that this range will extend from 1 to 10, if possible and to decrease the initial minimum capacity; to provide, for example, trimmer capacitors which may have an initial minimum capacity as low as 1 pF; and it is a further and important object of the invention to improve the accuracy of adjustment so that any given relative position between rotor and stator will always result in the same capacity, regardless of the number of changes which have been made by moving the rotor, and regardless of the direction of movement in which the rotor was turned.

SUBJECT MATTER OF THE PRESENT INVENTION

Breifly, an additional bushing is provided between the stator and rotor shaft, to provide a spacer; further, stator and rotor shaft are formed with recesses, notches, or the like, the bushings and other insulating elements and recesses being so shaped and dimensioned that the distance between the stator electrode (typically a metallization layer) and the rotor shaft is increased, while simultaneously providing better guidance for the rotor shaft, which results in substantially decreased stray capacity, and thus decreases the minimum capacity (Cmin) by at least half, in comparison with a similar capacitor without such spacer elements or bushings, and with conventional design.

In accordance with a feature of the invention, the stator is formed with a slide surface in the shape of a circumferential ridge which, however, is preferably interrupted along its circumferential extent. One-half of the circumferential ridge, between the diametrical notches formed therein, of the slide surface (with respect to the rotor) is metallized, to carry the stator electrode. The size, shape and position of the stator electrode is thus accurately determined by the size, shape and position of the circumferential ridge. The stator is formed with a depression between the ridge and the shaft for the rotor, to form an air chamber, bounded on the one side by the depression of the stator and on the other by the bottom surface of the rotor. The stator ridge, if subdivided by a diametrical groove, may be metallized on both halves of the ridge surface, for example to form a differential capacitor.

The bushing inserted in the central bore of the stator is preferably a plastic ring made of a material of low dielectric constant, for example polytetrafluoroethylene hereinafter called Teflon, which receives the shaft without play. Teflon has a very low coefficient of friction. To further decrease the minimum capacity of the trimmer capacitor, the rotor may be formed with depressions or notches, or may be slit towards the outer diameter.

In order to further space the stator electrode from the rotor shaft, the rotor itself is formed with a central bore through which a plastic bushing of a material of low dielectric constant, for example Teflon, is inserted. The shaft itself is formed with a knurled end, and press-fitted into the Teflon bushing for the rotor. The mechanical connection between the rotor and the rotor shaft is then obtained by the press fit, or interference fit between the Teflon bushing and the rotor itself, when the rotor shaft is press-fitted, with its knurled end, into the rotor bushing. The shaft, then, is insulated from the rotor electrode. To provide an electrical contact from the rotor electrode to the insulated shaft, a contact foil is provided connecting the metallization surface of the rotor to the central shaft. By press-fitting a separate shaft into the rotor bushing, a thinner shaft can be used than otherwise possible, thus further spacing the rotor electrical connection from the stator electrode. The rotor shaft may be formed, at both ends, with non-circular profiles, for example with hexagonal heads, or nuts, so that a plurality of such trimmers can be aligned, on a common support, for simultaneous adjustment from a single adjustment button.

The invention will be described by way of example with reference to the accompanying drawings, wherein:

FIG. 1 is a top view of the trimmer capacitor in accordance with the present invention;

FIG. 2 is a cross-sectional axial view along lines 2—2 of FIG. 1;

FIG. 3 is a bottom view of the trimmer;

FIG. 9 is a side view of the rotor shaft;

FIG. 10 is a sectional view of the rotor bushing;

FIG. 11 is a sectional view of the stator bushing;

FIG. 12 is a side sectional view of the contact strip;

FIG. 13 is a top view of the contact strip;

FIG. 14 is a part sectional view of a shaft end piece;

Figure 8:
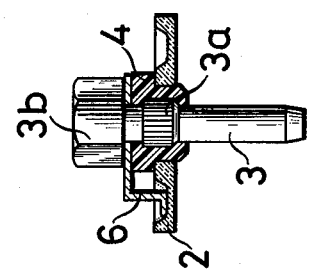
FIG. 8 is a sectional view of the rotor, attached to its shaft.
Figure 4:
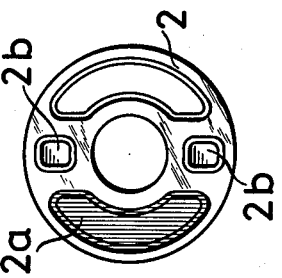
FIG. 4 is an axial section of the stator along lines 4—4 of FIg. 5.
Figure 5:
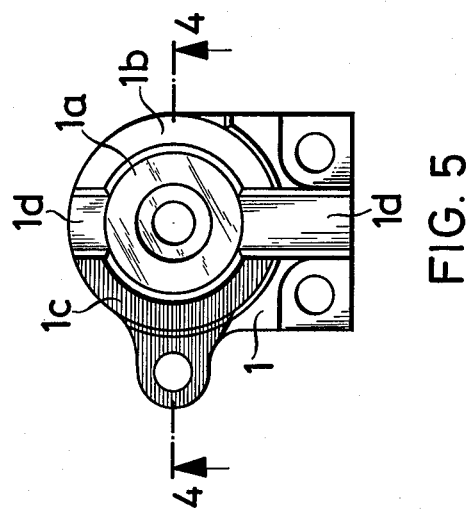
FIG. 5 is a top view of the stator.

The trimmer capacitor, basically, has a stator 1 and a rotor 2. In accordance with the present invention, the stator electrode, typically a coating on the stator, is separated from the rotor shaft by an air gap. Stator 1 (see FIGS. 4 and 5) is therefore formed with a depression 1a at the side facing the rotor 2. The depression surrounds the central opening of the rotor. The depression, therefore, at the edge of the stator, forms a raised, ring-shaped ridge 1b. The top surface of the ridge 1b is ground to be plane, and it is metallized by metal coating 1c in a range covering approximately 160° (see FIG. 5). The opposite portion of the ridge 1b, that is, that portion which is not metallized, is used to guide the rotor disk and support the rotor disk in plane position with respect to the stator. A diametrically extending depression 1d separates the portion of the ridge 1b which is metallized, at 1c, from that portion of the ridge 1b which is not metallized. Stray capacitances which might occur between the stator electrode 1c and the rotor shaft 3 (FIGS. 2, 8) as well as with the rotor electrode 2a (FIG. 2) are thus decreased when the trimmer is set for minimum capacity.

The stator is formed with a central opening to receive the shaft 3 of the rotor. To further decrease stray capacitances, a bushing 5 (FIGS. 2, 4, 11) is fitted into the central opening of the stator, to separate the ceramic portion of the stator from the metal of the shaft 3 of the rotor. The rotor, likewise, is formed with a central opening in which a bushing 4 of low dielectric constant, for example Teflon, is inserted (see FIGS. 2, 8, 10), to separate the metal shaft 3 from the ceramic disk 2 of the rotor.

In a preferred form of the invention, both the rotor ceramic disk 2, as well as the stator ceramic disk 1 are separated from the shaft 3 of the rotor by the respective bushings (for the rotor) and 5 (for the stator). It is not necessary, however, that both rotor and stator are formed with these bushings and either the rotor or the stator may have it, alone. Utilizing the Teflon bushings for both rotor and stator, however, improves the tracking and guidance of the shaft 3, and permits the use of a smaller and thinner shaft, thereby decreasing the stray or leakage capacity at the minimum capacity position of the trimmer.

The initial capacity can still be decreased by using a contact foil to connect the rotor electrode to the rotor shaft. Usually, the rotor electrodes was connected to the rotor shaft by soldering the rotor electrode or metallized coating. Soldering increases the quantity of material which is connected to the electrode of the rotor and thus increases the minimum capacity of the trimmer. By use of a contact foil 6 (FIGS. 2, 12, 13), the rotor shaft 3 can be connected, electrically, to the rotor metallized coating 2a. The foil 3 bears with one surface on the top surface of the Teflon bushing 4, and with the other surface it bears against the rotor shaft 3. Thus, the foil is further separated from the stator electrode by the step configuration thereof (see FIG. 8) which further decreases the minimum capacity of the trimmer.

Mechanical rotation is transferred from the shaft to the rotor by a mechanical friction and interference fit. The rotor shaft 3 is formed with a knurled section 3a (FIG. 9); the knurled section 3a is pressed into the Teflon bushing 4 which, in turn, is pressed into the rotor disk 2. The shaft 3, upon pressing into the Teflon bushing 4, slightly dilates the Teflon bushing which then securely seats in the rotor by an interference fit. The contact foil 6 is not stressed mechanically and turns with the shaft and the underlying bushing 4; it is only needed to provide electrical contact to the metal layer 2a.

Figures 6, 7:
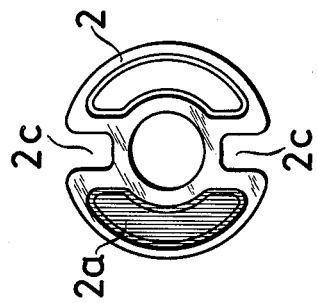
FIg. 6 is a top view of the rotor with diametric depressions.
FIG. 7 is a top view of another embodiment of a rotor with diametric notches.

The rotor disk 2 (see FIG. 6) is so shaped that stray capacitances between the metallized portion thereof and that portion which is free of electrode material is decreased. This decrease is particularly noticeable at the minimum capacity position of the trimmer. The decrease in minimum capacity is obtained by providing two additional depressions 2b (see FIG. 6) at the locations of the grooves 1d of the stator (see FIG. 5), so that thickness of the material beneath the depressions 2b is reduced to a minimum. With certain ceramic materials, of suitable strength, the depressions 2b can be carried clear through so that, in fact, two openings are formed in the rotor, spaced diametrically from each other.

If the mechanical strength of the ceramic dielectric permits, the depressions, carried completely through, may be extended to the diametrical outer diameters, so that two open notches 2c (FIG. 7) are formed.

The trimmer is held in assembled position by a spring 8, fitted at the bottom end of the shaft for example by a press fit, and by an end nut 7, threaded or press-fitted on the shaft.

The shape and assembly of the trimmer in accordance with the present invention substantially improves the accuracy of adjustment and reproducibility of capacity at certain angular positions of the rotor. This is particularly noticeable when considering the variation of capacity as a function of the angular position of the rotor. Trimmer capacitors heretofore used are subject to substantial deviation from the desired, approximately linear adjustment curve of capacity with respect to rotor rotation, when the rotor is turned in different directions. This error is particularly undesirable, since repeated adjustment to a certain angular position will not result in the same values of capacity of the trimmer. It has been found that the differences in capacity, at any given position of the trimmer usually vary in the order of about 10 pF; in accordance with the present invention, the variation in capacity, at a given angular position of the rotor is only about 1 pF, if a trimmer of the same characteristics and dimensions as well as the same wall thickness of the ceramic materials is used; in the comparative experiment, the dielectric of the rotor was the material subject to standard N 750.

It is believed that the reason for the deviation of capacity with respect to rotor position, upon repeated adjustment to the same rotor position is primarily due to the substantial ceramic tolerance between the stator bore and the rotor shaft. Thus, fitting an insulating bushing 5 into the rotor substantially increases the tracking and accuracy of guidance of the rotor shaft. This bushing, preferably of Teflon, also is a low-friction material, so that the rotor shaft is positively, as well as accurately positioned with respect to the stator. A further additional advantage is obtained in manufacture, since inserting a Teflon bushing eliminates the necessity to grind the central opening of the ceramic stator disk.

Figure 21:
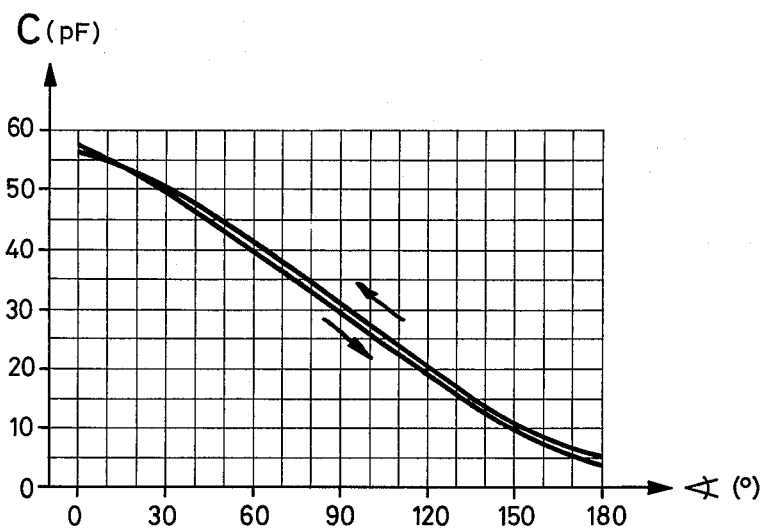
FIG. 21 is a tracking curve illustrating capacity of a trimmer capacitor, in accordance with the present invention (abscissa) with respect to rotor angle (ordinate)
Figure 22:
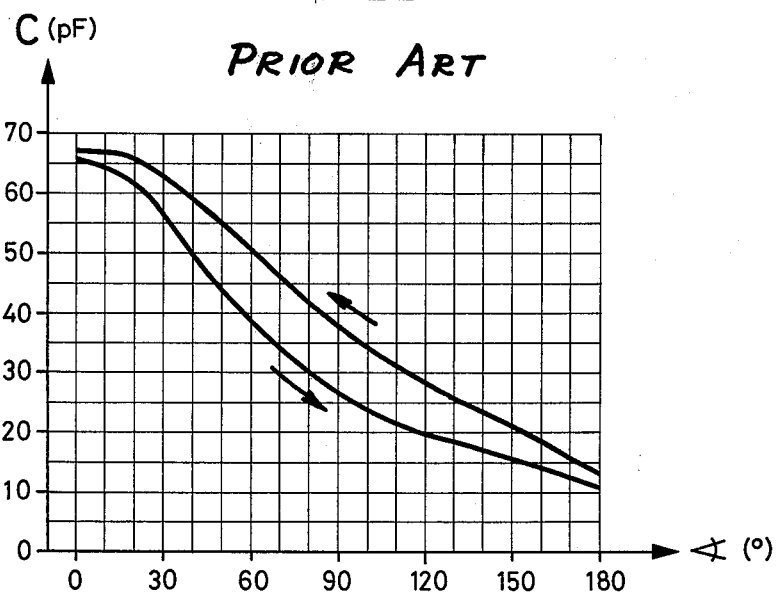
FIG. 22 is a graph similar to FIG. 21, and illustrating performance of comparable trimmers constructed in accordance with the prior art.

FIGS. 21 and 22 illustrate the difference of the trimmer of the present invention with respect to the prior art. The change in capacity, in accordance with the present invention, when rotating the trimmer from 0° to 180° is illustrated by the lower curve, with the arrow directed to the right; upon returning, the curve adjacent the arrow directed to the left is obtained. As can be seen, the curves are almost congruent. In contrast, and as illustrated in FIG. 2, a substantial difference in capacity at any given rotor position will arise, depending upon which direction the rotor is rotated.

Due to the accuracy obtained in capacity vs. rotor rotation, it is possible to gang the trimmers and obtain trimmer adjustment by means of a common adjustment shaft. Trimmers are frequently connected for common adjustment when a highly selective RF cascaded amplifier is to be adjusted. A plurality of trimmer capacitors (see FIG. 20) are mounted on a common support and connected together by means of connecting elements 12. The head end of the shaft 3 is formed with a noncircular profile, for example a hexagonal head 3b (FIGS. 18, 19) and the bottom end of the shaft has a counter nut 7, of similar hexagonal profile attached. The hexagonal nut 7 (see FIG. 14) is press-fitted on shaft 3, in accurate alignment with respect to the position of the edges of the head 3b on the other end of the shaft. The various trimmer shafts are then connected by connecting elements 12, typically of plastic material, ceramic, or the like, which are formed at their opposite ends with hexagonal recesses, fitting around the heads 3b and the counter nuts 7, respectively.

Figure 20:
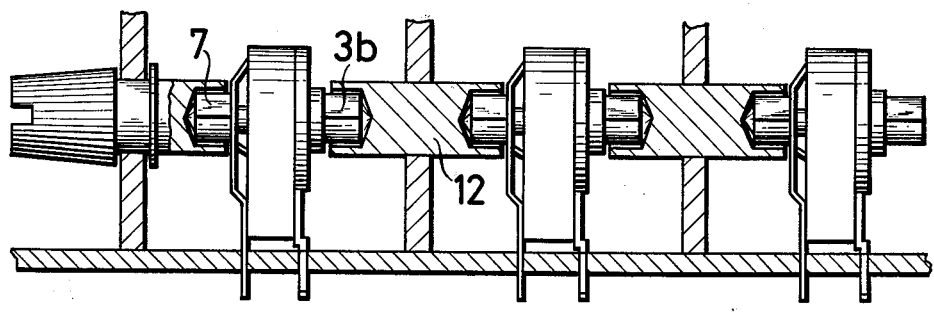
FIG. 20 is a side view, partly in section, of a plurality of trimmer capacitors, in stacked alignment, with connecting elements, for ganged operation.

Synchronous operation of a trimmer array as illustrated in FIG. 20 requires careful alignment of the nuts 7 with respect to the heads 3b, and alignment thereof with respect to the rotor electrodes, as well as accurate determination of the position, shape and size of the electrodes on the rotor and stator.

Accuracy of metallization, and accuracy of adjustment, and accuracy of the size and position of the electrodes on the stator and rotor is necessarily obtained since the stator is metallized at the ridge, which can be ground accurately, and the rotor metallization is placed in the recess 2a which, by its position and size on the rotor disk, accurately determines the size and position of the rotor electrode. The depressions 2a in the rotor disk are formed at the side remote from that which bears against the ridge 1b of the stator. Any stray metal deposits on the rotor, which extend beyond the depression where the electrode should be, can readily be removed by grinding.

The capacitor of FIGS. 1 and 2 utilizes a half-metallized section on the stator and a half-metallized section on the rotor, which can be brought in alignment, or in opposed position with respect to each other. A terminal 11 is brought out from the metallized coating of the stator electrode. The rotor electrode is connected over the spring 8 which, as shown in FIG. 3, may be for example a three-legged leaf spring, or washer-type spring, and which is formed with an additional connecting lug, to extend to a terminal plate. The terminal plate is formed with an insertion lug 8', and a cross piece which is riveted by rivets 10 to a front plate 9 which carries two additional insertion pins. The triangular insertion arrangement permits handing, by automatic machinery for example, and ready insertion into sockets, printed circuit boards, or the like. The arrangement, further, permits versatility since the same physical layout, by different electrical connection. Manufacturing costs, due to standardization, both of this trimmer as well as of trimmers as modified, are therefore decreased. The additional connecting lugs extending from top plate 9 and in electrical, galvanic connection with the spring 8, and hence with the rotor shaft, have additional shielding effect. It is to be noted that the metallization 1c on the stator is at the upper side in FIG. 1, that is, at the side remote from the connection to the rotor.

Figure 15:
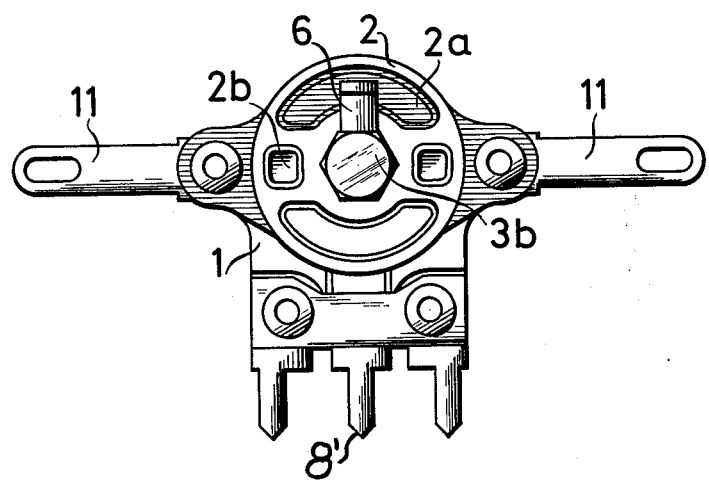
FIG. 15 is a top view of another embodiment of the trimmer, wtih differential connection.
Figure 16:
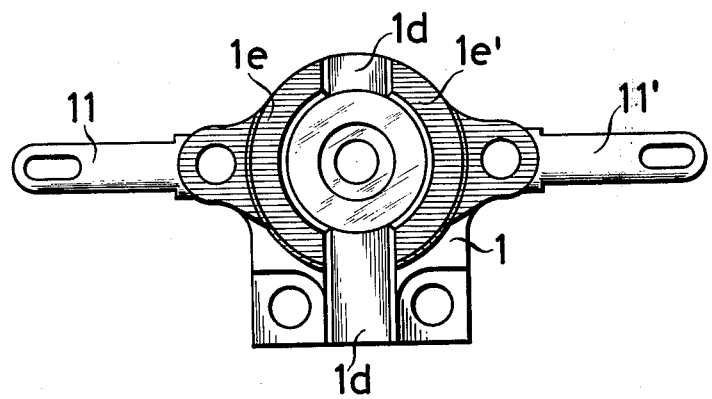
FIG. 16 is a top view of the stator of the trimmer of FIG. 15.

FIGS. 15 and 16 illustrate a capacitor for differential connections. Two stator electrodes 1e and 1e' are provided, one each located on one-half of the ridge 1c of the stator, and separated electrically from each other by the diametrical groove 1d. Electrical contact terminals 11 and 11' connect to the respective electrodes 1e, 1e'. In this circuit, two different values of capacity can be provided, at any given angle of rotation of the rotor. The respective values of capacity between terminal 8' and terminal 11 and 11', respectively, are complementary; thus, if the trimmer is designed for a range of up to 100 pF, the capacity values between terminals 11 and 8' will be complementary with respect to the capacity values between terminals 11' and 8'.

Figure 17:
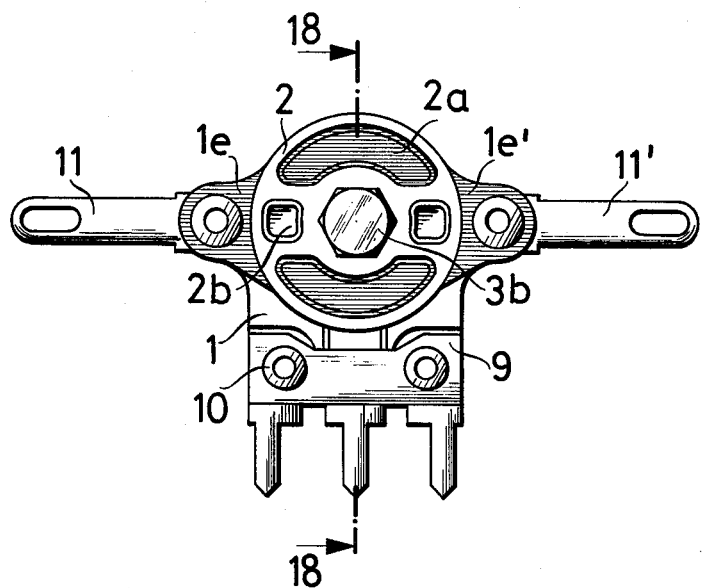
FIG. 17 is a top view of the trimmer connected for series connection.
Figure 18:
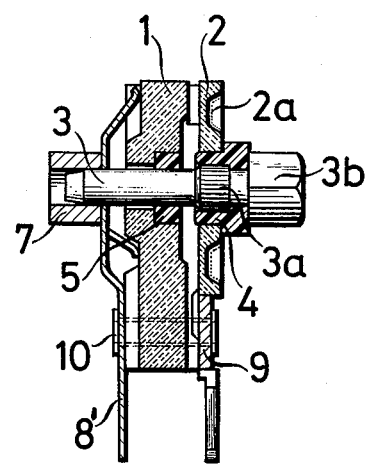
FIG. 18 is an axial section along lines 18—18 of FIG. 17.
Figure 19:
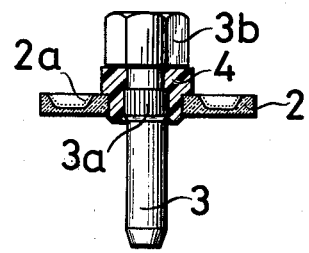
FIG. 19 is a part sectional view of the rotor, rotor metal coating, and rotor shaft for use in the embodiment of FIGS. 17 and 18.

The same construction can also be used for serial connection of two stator electrodes with respect to a single rotor. Referring to FIGS. 17 and 18, the two stator electrodes 1e, 1e' are constructed similarly to the embodiment of FIGS. 15 and 16. The rotor electrode 2a is, however, not connected to the shaft 3, that is, is left unconnected, and provides capacitative coupling between the metallized coatings 1e, 1e' by serial coupling therebetween. Maximum coupling is obtained when the rotor has maximum mutual overlap between the stator electrodes 1e, 1e'. The difference between the embodiment of FIGS. 17, 18 and of FIGS. 15 and 16 is the absence of the metal contacting foil strip 6, which is not present in the serially connected differential trimmer of FIGS. 17 and 18. The spring 8, which also forms an insertion terminal, is preferably also used for standardization of manufacture although a resilient, plastic bushing may be used instead.

Various changes and modifications may be made within the scope of the inventive concept.

I claim:
1. Ceramic trimmer capacitor having
   a stator disk (1) which is partly metallized and formed with an opening therein;

a rotor disk (2) which is at least partly metallized;

a metallic shaft (3) connected to the rotor (2) and passing through the opening in the stator;

and menas (7, 8) securing the shaft in position in the opening and thus maintaining the rotor against the stator, characterized in that the rotor is formed with a central opening, the shaft (3) being retained in said opening;

one side of the stator is formed with an unmetallized central zone (1a) recessed from the outer circumferential zone of the stator to form a central depression;

a bushing means (4, 5) of low dielectric, non-metallic material filled into at least one of said openings and surrounding said shaft (3), to increase the spacing between the metal of the rotor shaft (3) and the metallized portions of the stator forming the stator electrode (1c) while positively journalling the shaft (3).

2. Capacitor according to claim 1, wherein the circumferential zone of the stator disk is a raised, flat ridge (1b), said ridge being partly metallized to form a stator electrode (1c);

the dimension, form and position of the metallization on the ridge, with respect to the rotor, determining the capacity of the trimmer;

the recessed central zone (1a) and the surface of the rotor disk facing the stator forming an air chamber.

3. Capacitor according to claim 2, wherein a diametrical groove (1d) is formed transverse to the stator disk at one side thereof to divide the ridge into ridge segments, at least one of which is metallized, to form the stator electrode, or electrodes (1c, 1e, 1e').

4. Capacitor according to claim 3, wherein (FIGS. 15 to 18) two segments are provided and both ridge segments are metallized.

5. Capacitor according to claim 1, wherein the bushing means comprises a stator bushing (5) fitted in the opening of the stator and guiding the shaft for rotation with respect to the stator, said bushing comprising a plastic ring of low dielectric constant material formed with an opening securely, but rotatably holding the shaft (3).

6. Capacitor according to claim 1, wherein the bushing means comprises a rotor bushing (4) fitted in the opening of the rotor, said rotor bushing comprising a plastic ring of low dielectric material, the shaft (3) being knurled (3a) and inserted in the bushing with an interference fit to insulate the bushing from the rotor disk while providing a mechanical rotation-transmitting connection.

7. Capacitor according to claim 1, wherein at least one of the bushing means (4, 5) comprises a polytetrafluoroethylene ring.

8. Capacitor according to claim 1, wherein the face of the rotor disk (2) which is at least partly metallized is formed with a non-metallized recess (2b, 2c) to reduce stray capacitances.

9. Capacitor according to claim 8, wherein said recess comprises diametrical slots (2c) extending from the outer diameter of the rotor disk partly towards the center thereof.

10. Capacitor according to claim 1, further comprising a foil strip (16) connecting the metallization of the rotor to the metal of the shaft (3).

11. Capacitor according to claim 1, wherein one of the shaft has a non-round head (3b);

and a non-round counter-head (7) is secured to the other end of the shaft to permit attachment of connecting links (12) to gang a plurality of trimmers together.

12. A plurality of trimmers according to claim 11, comprising a support, the trimmers being secured on the support in axial alignment, at least one connecting link (12) having an engagement means fitting the head, and the counter-head, respectively, of the aligned trimmers and connecting said trimmers together.

* * * * *

UNITED STATES PATENT OFFICE
CERTIFICATE OF CORRECTION

Patent No. 3,898,540　　　　　　　Dated August 5, 1975

Inventor(s)　Manfred BREMSTAHLER

It is certified that error appears in the above-identified patent and that said Letters Patent are hereby corrected as shown below:

claim 1, column 7 line 15 "filled"

should read "fitted"

Signed and Sealed this second Day of December 1975

[SEAL]

Attest:

RUTH C. MASON　　　　　　　　C. MARSHALL DANN
*Attesting Officer*　　　　　　　*Commissioner of Patents and Trademarks*